(12) United States Patent
Philbrick

(10) Patent No.: US 12,524,511 B1
(45) Date of Patent: Jan. 13, 2026

(54) METHOD AND SYSTEM OF AUTOMATED NEURAL OSCILLATION AUTHENTICATION

(71) Applicant: UIPCO, LLC, San Antonio, TX (US)

(72) Inventor: Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 216 days.

(21) Appl. No.: 17/583,435

(22) Filed: Jan. 25, 2022

(51) Int. Cl.
G06F 21/32 (2013.01)
G06N 5/022 (2023.01)

(52) U.S. Cl.
CPC .............. *G06F 21/32* (2013.01); *G06N 5/022* (2013.01)

(58) Field of Classification Search
CPC ......... G06F 21/32; G06F 3/015; G06N 5/022; G06N 20/10
USPC ............................................................ 726/19
See application file for complete search history.

(56) References Cited

U.S. PATENT DOCUMENTS

| | | |
|---|---|---|
| 6,711,400 B1 | 3/2004 | Aura |
| 8,424,057 B2 | 4/2013 | Mardikar et al. |
| 8,554,674 B1 | 10/2013 | Subealdea et al. |
| 8,817,961 B1 | 8/2014 | Sterman |
| 9,706,401 B2 | 7/2017 | Vincent et al. |
| 10,149,156 B1 | 12/2018 | Tiku et al. |
| 10,154,025 B2 | 12/2018 | Tinnakornsrisuphap et al. |
| 10,218,695 B1 | 2/2019 | Jain |
| 10,299,118 B1 | 5/2019 | Karachiwala et al. |
| 10,445,732 B2 | 10/2019 | Oberheide et al. |
| 10,659,459 B1 | 5/2020 | Gadwale |
| 10,958,774 B1 | 3/2021 | Harding |
| 11,063,933 B2 | 7/2021 | Goldstone et al. |
| 11,263,631 B1 | 3/2022 | Arif et al. |
| 2003/0110381 A1 | 6/2003 | Aoshima et al. |
| 2006/0053296 A1 | 3/2006 | Busboom et al. |
| 2009/0198622 A1 | 8/2009 | Temte et al. |

(Continued)

FOREIGN PATENT DOCUMENTS

WO 2012055829 A1 5/2012

OTHER PUBLICATIONS

Alexandre Alapetite, "Dynamic 2D-barcodes for multi-device Web session migration including mobile phones", Technical University of Denmark, Department of Management Engineering Produktionstorvet 426-A, DK-2800 Kongens Lyngby, Denmark, doi: 10.1007/ s00779-009-0228-5. (Year: 2010).

*Primary Examiner* — Tan Doan
(74) *Attorney, Agent, or Firm* — Potomac Law Group, PLLC; Dannon G. Allbee

(57) ABSTRACT

Methods and systems described herein are directed to automatically authenticating a user identity using detected neural oscillation data for a given prompt presented to the user when attempting access to protected data. The neural oscillation data can be captured as the user is perceiving and/or contemplating a response for the prompt via a device configured for electroencephalography. In a case in which the neural oscillation data satisfies a predetermined threshold, the user's identity can be automatically authenticated and/or authentication information corresponding to the prompt can be automatically entered to enable the user to access the protected data. Such access can be further restricted via other biometric data also serving to ensure the user's identity.

20 Claims, 10 Drawing Sheets

(56) References Cited

U.S. PATENT DOCUMENTS

| | | |
|---|---|---|
| 2009/0249069 A1 | 10/2009 | Daskalopoulos et al. |
| 2011/0035788 A1 | 2/2011 | White et al. |
| 2011/0149867 A1 | 6/2011 | Rudolf et al. |
| 2011/0219427 A1 | 9/2011 | Hito et al. |
| 2011/0270751 A1 | 11/2011 | Csinger et al. |
| 2012/0198531 A1 | 8/2012 | Ort et al. |
| 2013/0170361 A1 | 7/2013 | Manyakin, Jr. et al. |
| 2013/0262857 A1 | 10/2013 | Neuman et al. |
| 2014/0223516 A1 | 8/2014 | Vongsouvanh et al. |
| 2014/0230039 A1 | 8/2014 | Prakash et al. |
| 2015/0334108 A1 | 11/2015 | Khalil et al. |
| 2017/0053108 A1* | 2/2017 | Jakobsson ............... G06F 21/32 |
| 2017/0068958 A1 | 3/2017 | Oberheide et al. |
| 2017/0091567 A1* | 3/2017 | Wang .................... A61B 5/681 |
| 2017/0250974 A1 | 8/2017 | Antonyraj et al. |
| 2018/0012009 A1* | 1/2018 | Furman ................. G06N 3/088 |
| 2018/0034798 A1 | 2/2018 | Vincent et al. |
| 2018/0041339 A1 | 2/2018 | Lee |
| 2018/0332042 A1 | 11/2018 | Yu et al. |
| 2019/0074972 A1 | 3/2019 | Shastri et al. |
| 2019/0297075 A1 | 9/2019 | Kaladgi et al. |
| 2019/0312726 A1 | 10/2019 | Sierra et al. |
| 2019/0386984 A1 | 12/2019 | Thakkar et al. |
| 2020/0029268 A1 | 1/2020 | Russell et al. |
| 2020/0162258 A1 | 5/2020 | Woo |
| 2020/0236113 A1 | 7/2020 | Monica et al. |
| 2021/0092227 A1 | 3/2021 | Naujok et al. |
| 2021/0152689 A1 | 5/2021 | Gayaldo |

* cited by examiner

METHOD AND SYSTEM OF AUTOMATED NEURAL OSCILLATION AUTHENTICATION

TECHNICAL FIELD

The present disclosure is directed to methods and systems of automated identity authentication using neural oscillations, commonly referred to as brainwaves, to trigger automatic authentication or other automatic data entry.

BACKGROUND

Identity theft is an increasingly prevalent obstacle to safeguarding against the improper use of personally identifiable information (PII) and other important data, such as date of birth (DOB), social security number or other government issued credential, residence address, etc. Such theft has also been observed with respect to financial data as well as critical corporate data detailing growth objectives and associated attainment strategies, employee records, and intellectual property records which often must not be revealed within a certain timeframe in order to obtain various legal rights.

Efforts to combat such theft have included increasing the robustness of authentication systems intended to preserve and protect the above types of data. In particular, such systems often require the authentication of an individual seeking access to the data via entry of an increasingly unique password. Because the password can often be lengthy and require an uncommon array of characters, it can be difficult to remember and thus hamper access to the necessary data. Furthermore, no matter the creativity of the password that may be entered to authenticate the identity of the individual, accomplished fraudsters seeking to obtain it are sometimes successful in doing so when perpetrating various hacking techniques.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
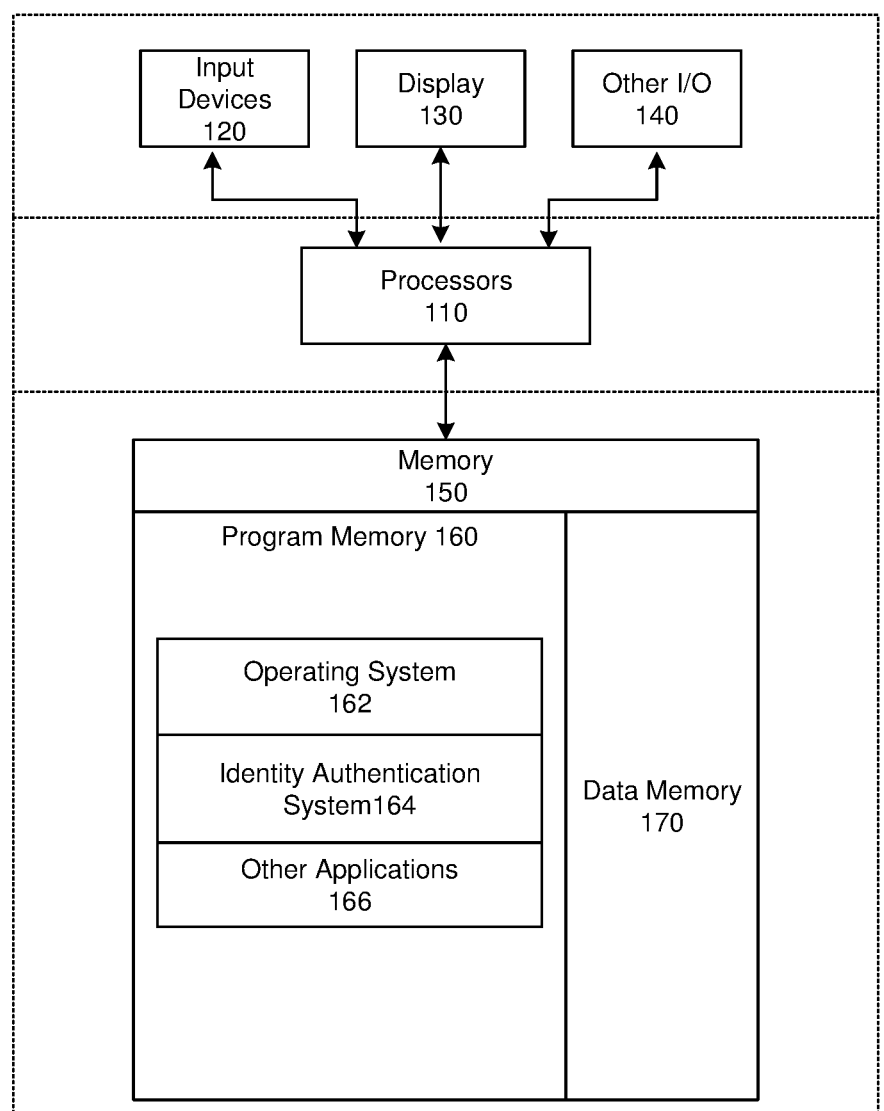
FIG. 1 is a block diagram illustrating an overview of devices on which some implementations can operate.

Aspects of the present disclosure are directed to automatic identity authentication using neural oscillations, commonly referred to as brainwaves, to trigger the automatic entry of required authentication information. In some implementations, the automatic entry of the required authentication information can be executed by an identity authentication system. To do so, the identity authentication system can receive one or more types of the neural oscillations as a neural oscillation authentication pattern (hereinafter "authentication pattern") for a given prompt provided to a target user. The given prompt can elicit the required authentication information such that the target user is stimulated to engage in mental activity producing neural oscillations that can be associable with the given prompt. In some implementations, the association can be measured with respect to a predetermined threshold for the authentication pattern. In a case in which the predetermined threshold is satisfied, the identity authentication system can automatically authenticate the identity of the target user. Herein, the term "target user" means a user for whom identity authentication is required to access protected data, the term "prompt" means a textual, voice, and/or image presented in connection with an attempt to access protected data, and the term "authentication pattern" means neural oscillation data permitting the authentication of the target user's identity.

In some implementations, an authentication pattern can be measured using a machine learning model trained to identify authentication patterns provided by the target user for a registered prompt. The registered prompt can be a prompt for which the target user is familiar and neural oscillation data enabling authentication of the target user's identity has been previously recorded with an identity authentication system. To carry out the evaluating, neural oscillation data for the registered prompt of the target user can be pre-recorded and compared to neural oscillation data collected subsequently when the target user attempts access to protected data. Using these patterns of neural oscillation data, the identity authentication system can produce a match score defining similarity between the pre-recorded and subsequently collected neural oscillation data. In some implementations, a match score can be generated with other techniques, such as comparing the peak and valley points between the neural oscillation patterns. If the match score is greater than a predetermined threshold, the identity authentication system can authenticate the target user's identity and permit access to the protected data.

In some implementations, an authentication pattern can be evaluated using a machine learning model. The machine learning model can be trained to predict an authentication pattern for an unregistered prompt provided to a target user. The unregistered prompt can be a prompt for which the target user is unfamiliar and has not previously supplied neural oscillation data to an identity authentication system when attempting access to protected data. To carry out the evaluating, predicted neural oscillation data for a type of such an unregistered prompt can be compared to measured neural oscillation data for that prompt when the target user attempts access to protected data. If the measured neural oscillation data is sufficiently similar to the predicted neural oscillation data, the identity authentication system can authenticate the target user's identity (i.e., they are most likely for the same target user).

In some implementations, the identity authentication system can include one or more techniques for physically obtaining neural oscillations for the authenticating discussed herein. As an example, the identity authentication system can interface with one or more augmented reality or virtual reality devices, such as may be implemented by eyewear or headwear. In this regard, it is contemplated that such devices may be configured to perform electroencephalography and communicate with the identity authentication system to relay brain activity evincing one or more responses to a particular prompt for authentication information. In another example, the identity authentication system can interface with other electroencephalography enabled devices, such as headphones, glasses, smart watches, etc.

In some implementations, the identity authentication system can verify that the neural oscillations for an authentication pattern are indeed those of the target user at the time at which they were generated. To do so, the identity authentication system can obtain other biometric data from the device providing the aforementioned neural oscillations and/or interface with one or more other biometric evaluation devices to receive output therefrom so as to verify, for example, liveness of a contemporaneous receipt of the authentication pattern. Accordingly, such other biometric data and/or data provided by the interface can enable the identity authentication system to provide a process for multi-factor authentication, whereby information provided by the discussed devices can be used in combination with the authentication pattern to provide access to protected data.

In view of the above, it can be understood that the identity authentication system according to some implementations of the present technology vastly improves security and useability in authentication information systems, e.g., when attempting to access protected data. For example, and in contrast to conventional keyed entry of authentication data, the identity authentication system can automatically authenticate a target user's identity using an interpretation of one or more neural oscillations generated in response to a provided prompt. Furthermore, the unique processes of the identity authentication system to analyze novel neural oscillation data, e.g., in relation to an unregistered prompt the user may not have previously seen and determine if it is sufficiently similar to a predicted neural oscillation for this user, can increase security by eliminating the ability of a hacker to merely obtain previous authentication data to reauthenticate. In this way, the identity authentication system provisions a wholly unique layer of security for data entry since any authentication pattern derived from such neural oscillations would not be reproducible by someone other than the authorized user of the system. In some implementations of the present technology, the identity authentication system can augment a level of provided security by further conditioning the entry of the authentication information using one or more additional biometrics, such as a fingerprint identification and/or any ocular characteristics such as eye movement, iris recognition, and/or retinal scan, to name a few. Additionally, the automatic entry of authentication or other information provided by the identity authentication system according to some implementations of the present technology can increase the speed and accuracy of such entry. Still further, such automatic entry may prove invaluable to target users who may experience certain physical challenges disallowing their ability for manual input of data via a keyboard, for instance. Thus, there is provided an identity authentication system which departs from conventional systems of data entry with respect to its provisioning of enhanced security and ease of use. Several implementations are discussed below in more detail in reference to the figures.

FIG. 1 is a block diagram illustrating an overview of devices on which some implementations of the disclosed technology can operate. The devices can comprise hardware components of a device 100 that can perform identity authentication using neural oscillations to trigger automatic authentication or other entry of information. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an identity authentication system 164, and other application programs 166. Memory 150 can also include data memory 170, prompt neural oscillation data, prompt response neural oscillation data, prompt representation data, and correspondence data between the neural oscillation data and the prompt representation data, machine learning data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
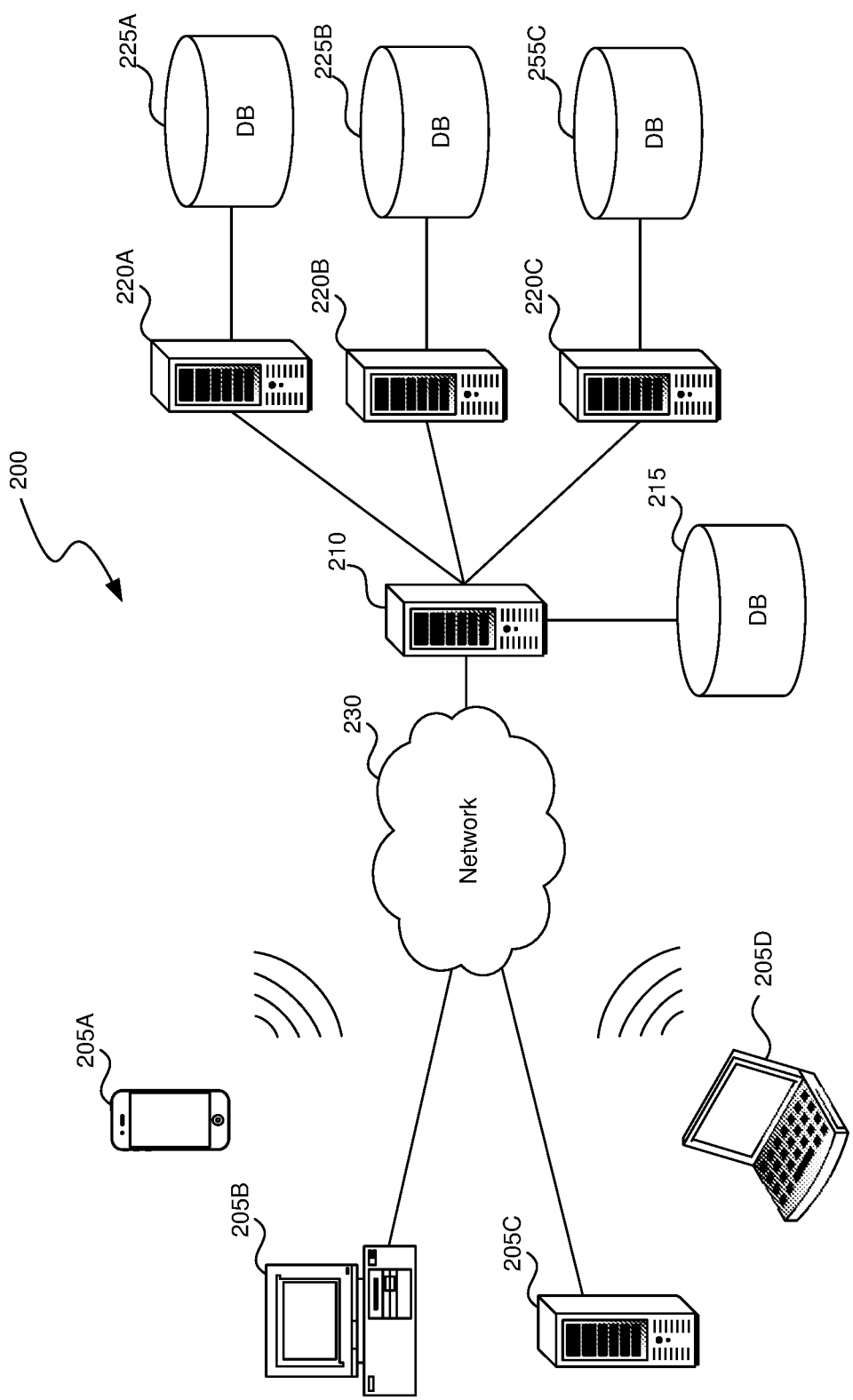
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as prompt neural oscillation data, prompt response neural oscillation data, prompt representation data, and correspondence data between the neural oscillation data and the prompt representation data, machine learning data, and configuration data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
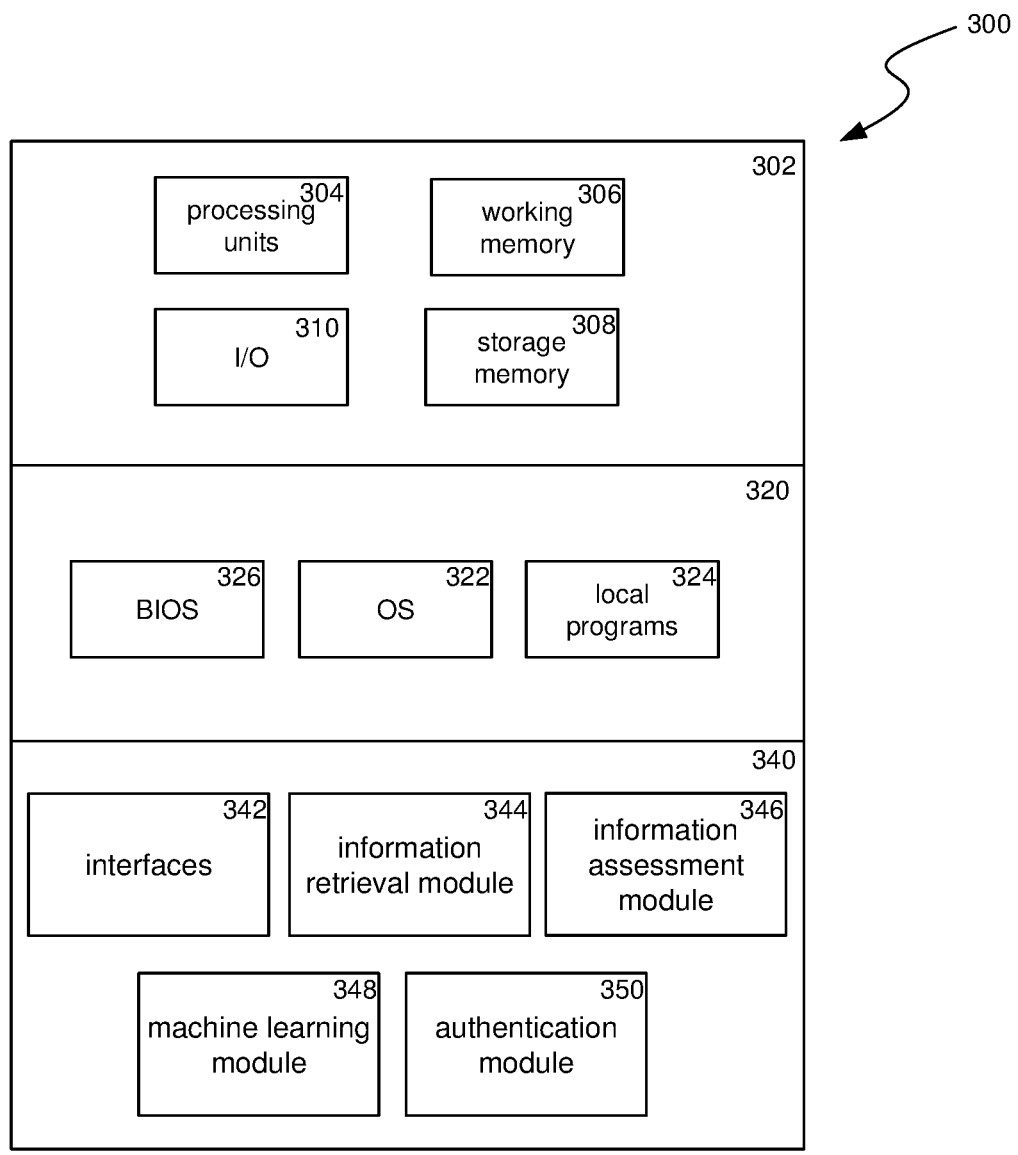
FIG. 3 is a block diagram illustrating components which, in some implementations, can be used in a system employing the disclosed technology.

FIG. 3 is a block diagram illustrating components 300 which, in some implementations, can be used in a system employing the disclosed technology, e.g., the identity authentication system 164. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include information retrieval module 344, information assessment module 346, machine learning module 348, authentication module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, the information retrieval module 344 can retrieve neural oscillation data from a target user of the identity authentication system 164. Such neural oscillation data can be sourced from one or more augmented reality or virtual reality devices, or other device(s) (e.g., such as headphones, glasses, smart watches, etc.) configured for conducting electroencephalography. This neural oscillation data can be gathered while the target user views or otherwise perceives a prompt and/or contemplates a response for the prompt. Such neural oscillation data can be received by identity authentication system 164 via one or more of the interfaces thereof. In some implementations, information retrieval module 344 can retrieve other biometric data, such as that which may be generated and transmitted by one or more readers of information such as fingerprint patterns and ocular characteristics while the target user views or otherwise perceives the aforementioned prompt and/or formulates any thought in regard to the prompt.

In some implementations, information assessment module 346 can intake data from the information retrieval module 344 to assess a correspondence between the presented prompt and the retrieved neural oscillation data. In this regard, the correspondence can be derived from a prior observed relationship of neural oscillation data of the target user for a registered prompt, i.e., a prompt previously perceived by the target user and producing an authentication pattern which is thus known to and registered with the identity authentication system 164. In some implementations, the correspondence can be derived by reference to a lookup table of the identity authentication system 164. When in receipt of other biometric data as discussed above, information assessment module 346 can, in some implementations, similarly assess correspondence for such data by reference to the same or a similar lookup table containing different types of biometric identity patterns for the target user.

In some implementations, machine learning module 348 can analyze and/or predict neural oscillation data for a prompt provided to the target user. Machine learning module 348 can accomplish this by converting pre-recorded neural oscillation data for a registered prompt and measured neural oscillation data for that prompt to machine learning model inputs. Machine learning module 348 can process these inputs to determine an output comprising a match score for the data. The match score can define a degree of similarity between each of the aforementioned data to indicate whether the pre-recorded neural oscillation data and the measured neural oscillation data are from the same target user.

In some implementations, machine learning module 348 can predict the user's neural oscillation data for an unregistered prompt provided to the target user, and authentication can be performed if the measured neural oscillation data for the user matches the predicted neural oscillation data. Machine learning module 348 can accomplish this by using a first model trained to produce what a particular user's neural oscillation data will be for any given prompt; converting, to machine learning model inputs, the predicted neural oscillation data for the unregistered prompt and measured neural oscillation data for the prompt for a user requesting authentication. The second machine learning model can process these inputs to determine an output defining a comparison (e.g., match socre) between each of the aforementioned neural oscillation data items. The comparison can define a probability for whether the measured neural oscillation data is the data which would have been expected if this is the authorized user, according to the predicted neural oscillation data for the authorized user.

In some implementations, authentication module 350 can compare output from the machine learning module 348 to determine whether the neural oscillation data retrieved from the target user yields an authentication pattern warranting authentication to be performed or the automatic entry of other authentication information. In some implementations, the authentication module 350 can determine whether the match score is greater than a predetermined threshold. If so, the authentication module 350 can authenticate the target user's identity, and enable access to protected data.

Those skilled in the art will appreciate that the components illustrated in FIGS. 1-3 described above, and in each of the flow diagrams discussed below, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described below.

Figure 4:
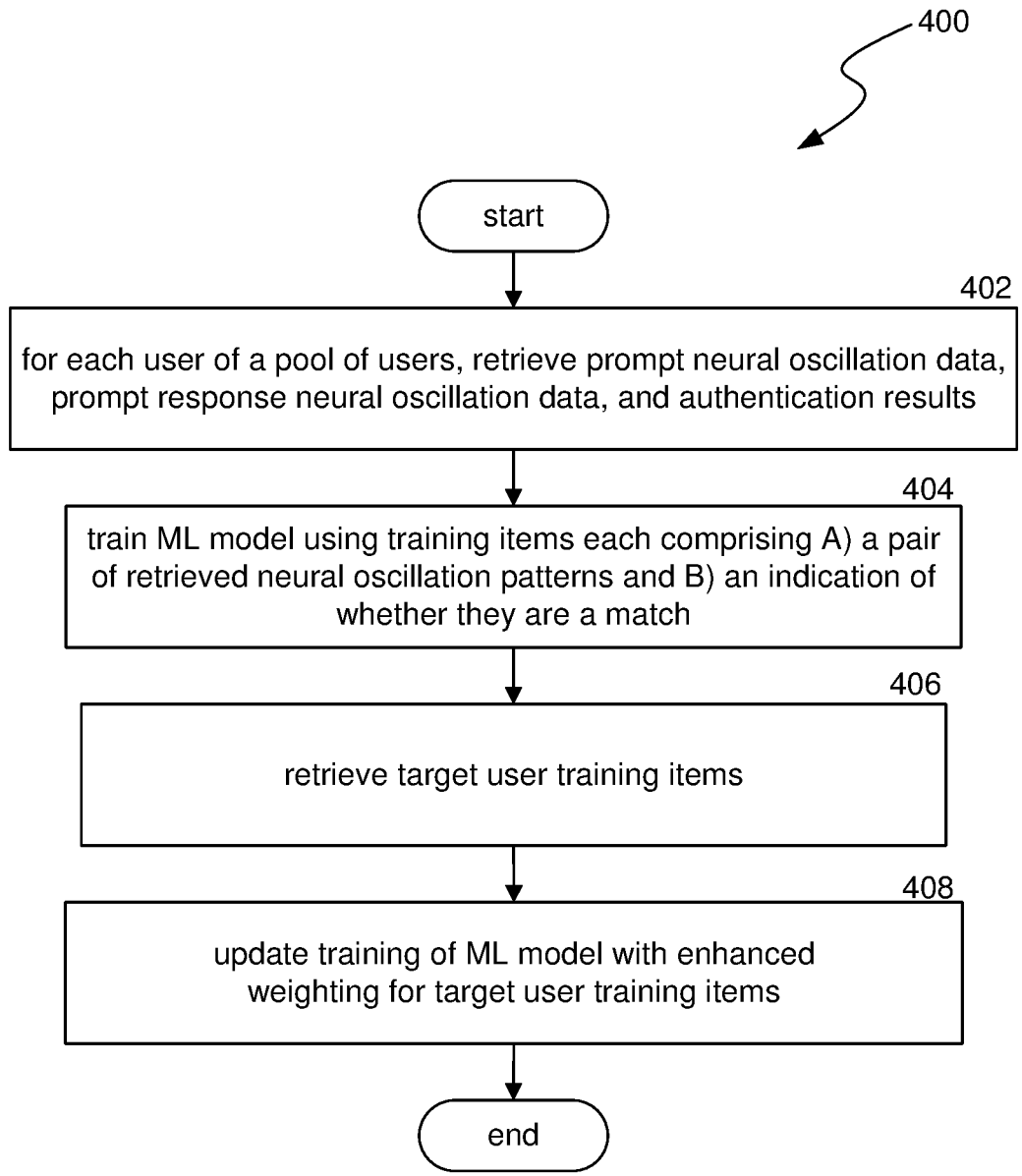
FIG. 4 is a flow diagram illustrating a process used in some implementations for training a machine learning module to identify correspondence between a registered target user prompt and a neural oscillation authentication pattern for that prompt.
Figure 5:
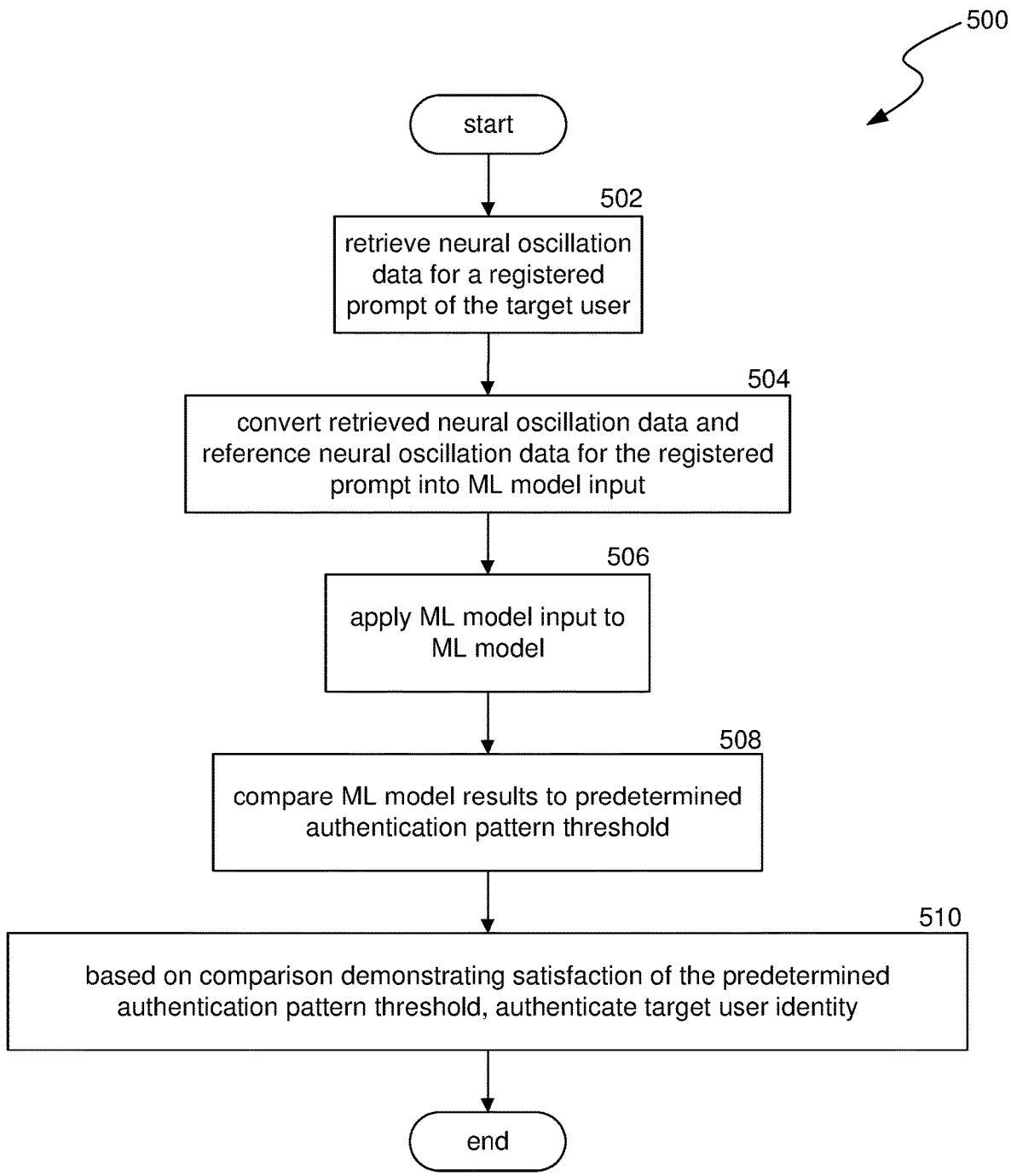
FIG. 5 is a flow diagram illustrating a process used in some implementations to, according to the machine learning model training of FIG. 4, authenticate a target user identity using a neural oscillation pattern of a target user for a registered prompt satisfying a predetermined authentication pattern threshold.

In referring to FIGS. 4-5, processes are illustrated for determining whether to authenticate the target user in response to the target user perceiving and/or contemplating a response to a registered prompt (i.e., a prompt that the user has seen and for which a corresponding neural oscillation pattern has been recorded).

Figure 7:
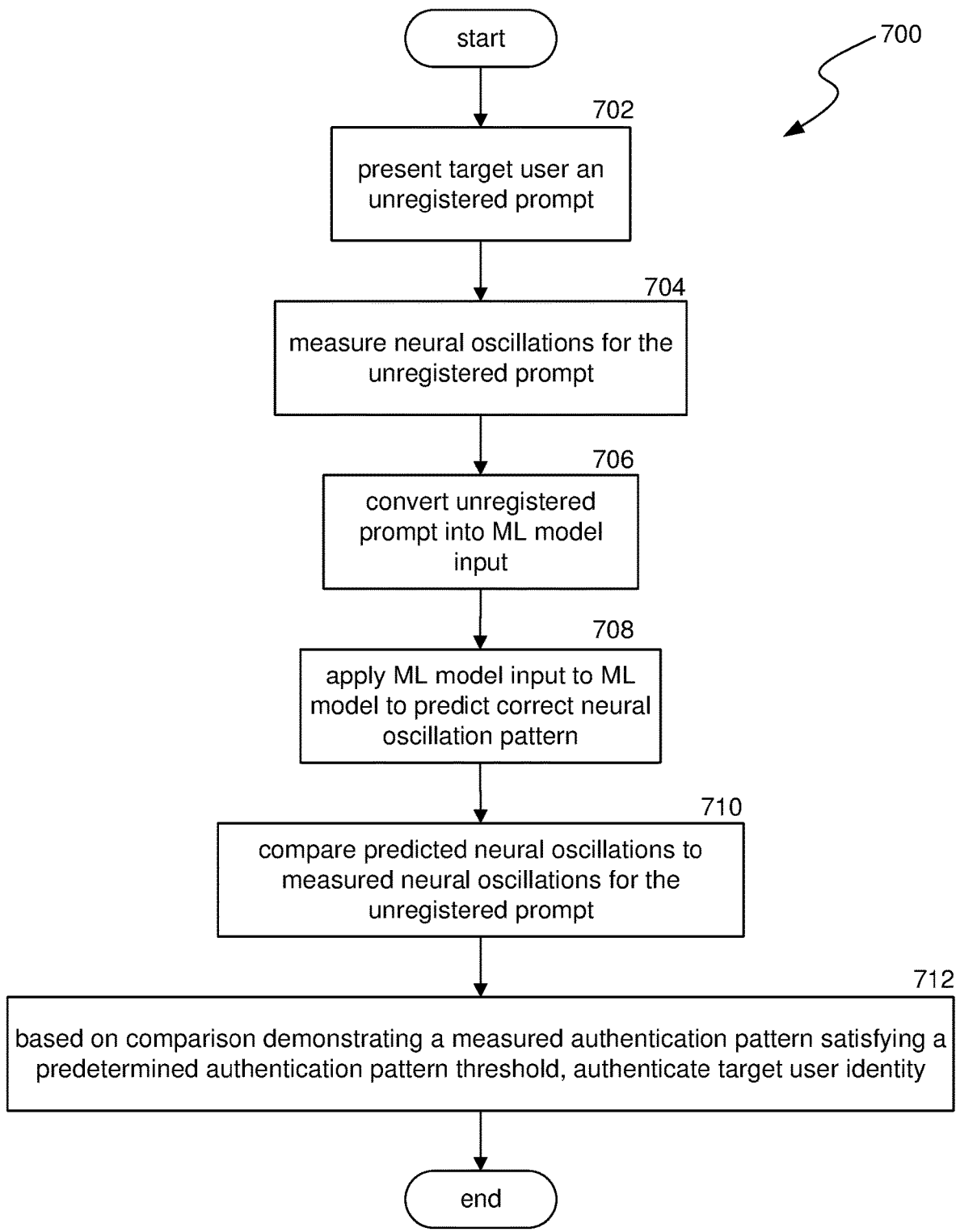
FIG. 7 is a flow diagram illustrating a process used in some implementations of the present technology to, according to the machine learning model training of FIG. 6, authenticate a target user identity using a neural oscillation pattern of a target user for an unregistered prompt satisfying a predetermined authentication pattern threshold.

FIG. 4 is a flow diagram illustrating a process 400 used in some implementations for training a machine learning model to identify correspondence between the registered target user prompt and a neural oscillation authentication pattern for that prompt. Process 400 can be performed by identity authentication system 164 to train a machine learning model, e.g., for use in the authentication process 500 of FIG. 5 and/or the authentication process 500 of FIG. 7. The machine learning model, once trained, can receive two neural oscillation patterns (e.g., neural oscillation pattern for a registered prompt or predicted for the authorized user to be compared with a measured neural oscillation pattern from the target user) and can produce a match score.

Thus, at block 402, process 400 can, for each user of a pool of users, retrieve prompt neural oscillation data representing respective authentication patterns for one or more prompts which had been presented to each user. At block 402, process 400 can retrieve pairs of neural oscillation patterns, where each pair is labeled as either being recorded for the same user for the same prompt, or as being recorded for different users and/or for different prompts. In other words, such prompt response neural oscillation data labeled as being recorded for the same user for the same prompt can be data recorded when a user sees the same prompt at different times. For example, these labels can be recorded when a user is successfully authenticated at different times when the user is prompted to, for example, think about her password. The prompt response neural oscillation data labeled as being recorded for different users and/or for different prompts can be data recorded when a user sees different prompts at different times or when different users see the same or different prompts. It is contemplated that each of the above neural oscillation data can be obtained via one or more of the devices discussed herein which is configured for electroencephalography when the pool of users is requested to respond to a prompt or performing another task. Further, it is also contemplated that such above neural oscillation data can be obtained, i.e., recorded, when a plurality of the pool of users manually enters a response to a prompt via any of the exemplary computing devices of FIG. 2, for example.

At block 404, process 400 can train the machine learning model to identify a match score between two neural oscillation patterns, based on the retrieved neural oscillation data discussed with reference to block 402. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. The machine learning model can be trained with supervised learning, where the training data includes two input instances of the neural oscillation data paired with a label as to whether those two instances of neural oscillation data match (i.e., were generated by the same user for the same prompt). The match score output from the model can be compared to the desired output (the correct identification of whether the input neural oscillation patterns were a match) and, based on the comparison, the model can be modified (e.g., applying a loss function), such as by changing weights between nodes of the neural network or parameters of the functions used at each node in the neural network. After applying each of the pairings of the inputs and the desired outputs in the training data and modifying the model in this manner, the model is trained to evaluate new instances of whether a pair of neural oscillation patterns match and thus were for the same user for a given prompt. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats. In some implementations, the model is trained after block 404 and is not further updated to be user-specific through the operation of block 406 and 408.

At block 406, process 400 can retrieve target user training items comprising neural oscillation data for a plurality of registered prompts of the target user. Process 400 can retrieve pairs of neural oscillation patterns from the target user, where each pair is labeled as being recorded for the same or different prompt. For instance, the training items of block 406 can include prompt response neural oscillation data recorded when the target user sees the same prompt at different times. In addition, negative training items can be neural oscillation patterns from the target user for different prompts and/or one neural oscillation pattern for the target user and one from another user for the same or different prompts. Labels for the patterns can be recorded when the target user is successfully authenticated at different times when the target user is prompted to, for example, think about her password or the word "password." The retrieved neural oscillation patterns paired with their labeling can be user-specific training items for the machine learning model. The retrieval can be executed by any of the aforementioned devices configured for electroencephalography.

At block 408, process 400 can update the training of the machine learning model to invoke enhanced weighting distinguishing target user correspondence between neural oscillation data and a corresponding authentication pattern. For example, process 400 can, when a pair of neural oscillation patterns from a training item are evaluated, invoke the enhanced weighting for model edges/parameters to train the model to be better at generating match scores particularly for the target user. The enhanced weighting can be defined according to, for example, exact and/or other levels of similarity of matching of the target user neural oscillation patterns for a registered prompt, whereas the matching and/or similarity accounts for aspects of the data, including, for example, wavelength, amplitude, and frequency. That is, the machine learning model can be trained to require the aforementioned types of similarity in order to recognize that two different neural oscillation patterns are those of the same target user for a same registered prompt.

As noted above, FIG. 5 is a flow diagram illustrating a process 500 used in some implementations to authenticate a target user identity using a neural oscillation pattern for a registered prompt. Process 500 can be initiated whenever the target user attempts access to protected data. Process 500 can be performed in response to the target user being presented a registered prompt at a time of attempting access to the protected data.

At block 502, process 500 can retrieve neural oscillation data for a target user in response to the target user being presented a registered prompt. As is described below with reference to FIG. 9, the neural oscillation data can comprise one or more patterns of brain activity which are provoked by the registered prompt being presented, as has been discussed, in the form of a textual request, voice request, and/or an image for obtaining authentication information.

At block 504, process 500 can convert the neural oscillation data retrieved at block 502 and reference neural oscillation data for the registered prompt into machine learning model inputs. For example, values for the retrieved neural oscillation data and the reference neural oscillation data can be entered into a vector, set of peak/valley points, function fit to the neural oscillation data, or other representation matching brain activity (as is discussed with reference to FIG. 9) that can be fed into a machine learning model.

At block 506, process 500 can apply the machine learning model input generated at block 504 to a machine learning model trained according to process 400 of FIG. 4. When the aforementioned input is applied, the machine learning model can generate a match score defining a probability of similarity between the neural oscillation data retrieved at block 502 and the reference authentication pattern.

At block 508, process 500 can compare the machine learning model results, i.e., the generated match score, to a predetermined authentication pattern threshold. For example, such a threshold could require 90% or more similarity among each of the wavelength, amplitude, and frequency of retrieved neural oscillation data as against the reference neural oscillation data for the registered prompt. Setting of the threshold in this manner thus establishes a tolerance for the production of neural oscillation data that may, for instance, allow for minor deviation in the target user's realization and/or perception of the registered prompt.

If the comparison at block 508 shows the match score exceeds an authentication pattern threshold, process 500 can, at block 510, automatically authenticate the target user's identity or enter other authentication data (e.g., security key or password) for the target user. In some implementations, instead of performing an authentication, the user's neural oscillation pattern can be mapped to one of various inputs (e.g., a set of PII, a phrase previously selected by the target user, or other data of which the target user had previously provided to identity authentication system 164) which process 400 can automatically enter in a data field.

Figure 6:
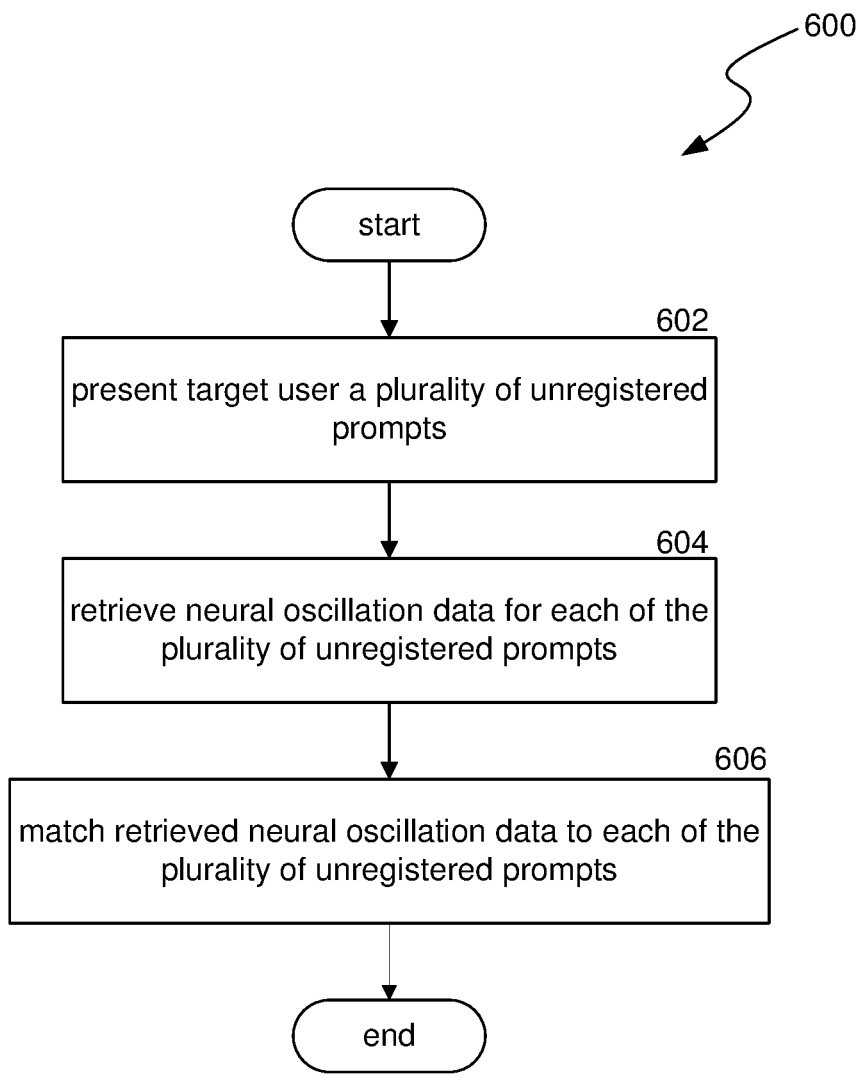
FIG. 6 is a flow diagram illustrating a process used in some implementations of the present technology for training a machine learning model to identify a neural oscillation authentication pattern for an unregistered prompt provided to a target user.

FIG. 6 is a flow diagram illustrating a process 600 used in some implementations of the present technology for training a machine learning model to predict a neural oscillation authentication pattern for an unregistered prompt provided to a target user, i.e., a prompt for which the target user may be unfamiliar when attempting access to protected data. To do so, the machine learning module 348 can retrieve neural oscillation data for a plurality of unregistered prompts provided to a target user when attempting access to protected data or otherwise contemplating the unregistered prompts. Process 600 can be performed by identity authentication system 164 in anticipation of implementing authentication of the target user's identity for one or more unregistered prompts.

At blocks 602 and 604, process 600 can present a target user a plurality of unregistered prompts and can obtain, from the target user, corresponding neural oscillation data for each prompt. In some implementations, similar prompt to neural oscillation data training items can be obtained for other users, but which may be weighted less heavily in the training discussed below for block 606.

At block 606, process 600 can use the training item pairs from blocks 602 and 604 (each comprising a prompt and a corresponding neural oscillation data) to train a model to predict neural oscillation data for a particular user for any given prompt (or prompts having a type similar to the training items—e.g., pictures of cats, pictures from the target user's photo library, phrases from literature, etc.) Thus as each pair is applied to the model, model weights/parameters can be updated (e.g., by applying a loss function) to train the model. As is discussed in regard to FIG. 7, the model, once trained, can be used to predict a neural oscillation pattern for a given target user, for any unregistered prompt which is presented to the target user.

As noted above, FIG. 7 is a flow diagram illustrating a process 700 used in some implementations of the present technology to authenticate a target user identity using a neural oscillation pattern for an unregistered prompt provided to the target user. Process 700 can be initiated whenever the target user attempts access to protected data. Process 700 can be performed in response to the target user being presented an unregistered prompt when attempting access to the protected data.

At block 702, process 700 can present the target user an unregistered prompt at a time when the target user attempts access to protected data. The unregistered prompt can be in the form of a textual request, voice request, and/or an image for authentication information. In some implementations, the prompt can be of a type matching a type for which the machine learning model of process 600 was trained. For example, if the machine learning model of process 600 was trained to predict neural oscillation patterns for a user for nature pictures, a nature picture prompt can be provided at block 702.

At block 704, process 700 can measure neural oscillation data, for the target user, when the presented with the unregistered prompt. As discussed above, this can be measured via an artificial reality device, headphones, a smartwatch, etc.

At block 706, process 700 can convert the unregistered prompt into a machine learning model input. For example, values a textual prompt can have its words and other characteristics entered into a vector that the machine learning model has been configured to receive. In other implementations, an image prompt can be converted into a histogram that the machine learning model has been configured to receive.

At block 708, process 700 can apply the machine learning model input generated at block 706 to a machine learning model (e.g., trained using process 600 of FIG. 6) to generate a predicted authentication pattern, for the authorized user, for the unregistered prompt presented at block 702. Notably, the unregistered prompt presented at block 702 is a prompt which the target user may have never perceived or at least for which a neural oscillation pattern is not recorded.

At block 710, process 700 can compare the predicted oscillation pattern from the machine learning model applied at block 708 with the neural oscillation data measured at block 704 to get a match score. In some implementations, the comparison can be done by an algorithm (e.g., matching peaks and valleys between patterns, wavelength, amplitude, frequency etc. between the neural oscillation patterns. For example, process 700 can ascertains a degree of morphing which would have to occur among the retrieved neural oscillation data and the predicted authentication pattern for them to coincide. In other implementations, process 00 can compare the neural oscillation patterns by applying a second machine learning model, such as the one trained using process 400 of FIG. 4.

If the comparison at block 710 shows that the match score (between the compared neural oscillation patterns) exceeds an authentication pattern threshold, process 700 can, at block 712, automatically authenticate the target user's identity or enter other authentication data (e.g., security key or password) for the target user.

Figure 8:
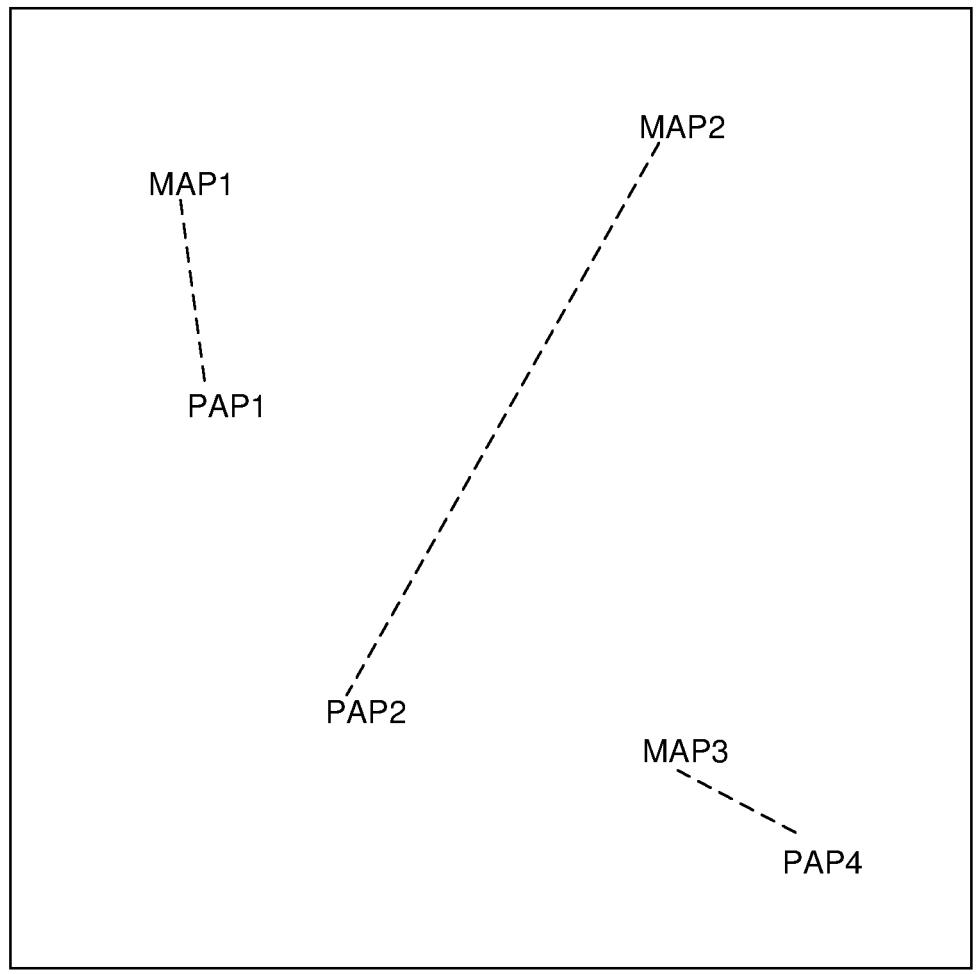
FIG. 8 is a conceptual diagram illustrating a spatial representation of comparative determinations of proximity for predicted and measured neural oscillation patterns for an unregistered prompt when assessing satisfaction of the predetermined authentication pattern threshold implemented according to FIG. 7.

FIG. 8 is a diagram for illustrating a spatial representation of comparative determinations of proximity for each of predicted authentication patterns and measured authentications patterns. The determinations may be generated when assessing whether neural oscillation data, like that retrieved at block 702, authenticates a target user's identity. For example, the illustration conveys whether a measured authentication pattern (MAP) for an unregistered prompt satisfies the above-discussed predetermined threshold when it is compared to a predicted authentication pattern (PAP) for a same or similar type of unregistered prompt. That is, for a prompt "black dog," the model trained with process 600 can predict a neural oscillation pattern e.g., PAP1, for the authorized user and can obtain the measured neural oscillation pattern MAP1 when a target user is presented with this "black dog" prompt. The length of the dotted lines between each pair represents an amount of mismatch between a given MAP and PAP, and can be used to gauge whether the MAP may satisfy the predetermined authentication pattern threshold. For example, the line between MAP1 and PAP1 is below a threshold maximum distance and therefore would result in an authentication while the line between MAP2 and PAP2 is above the threshold maximum distance and therefore would result in denial of authentication.

Figure 9:
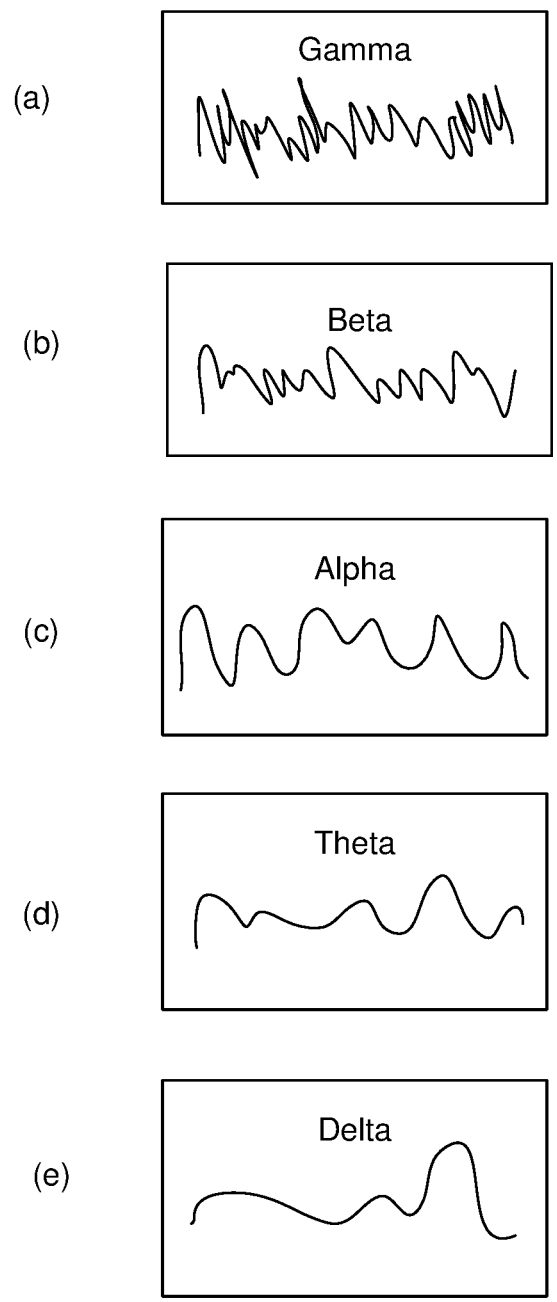
FIG. 9 is a pictorial listing of neural oscillation patterns in which one or more thereof can define a neural oscillation authentication pattern according to some implementations of the present technology.

FIG. 9 is a pictorial listing of neural oscillation patterns in which one or more thereof can define a neural oscillation authentication pattern according to some implementations of the present technology. In particular, the listing demonstrates examples of the five different types of neural oscillation data commonly recognized and referred to as "brainwaves." The listing is provided to demonstrate differences in patterning for brain activity which can be associated with certain tasks, such as when perceiving a prompt as discussed herein and formulating a response for the prompt.

FIGS. 9(a)-9(e) illustrate the specific pattern types for levels of brain activity which can be measured according to frequency, i.e., a measurement of the number of waves in a patterning that pass a fixed point during a fixed time period. In referring to FIG. 9(a), there is shown a patterning for a Gamma brainwave commonly indicating heightened consciousness. FIG. 9(b) shows a Beta brainwave ordinarily associated with problem solving. FIG. 9(c) shows an Alpha brainwave which is understood as indicating a state of relaxation. FIG. 9(d) shows a Theta brainwave which has been observed to occur during states of decreased consciousness and dreaming. FIG. 9(e) illustrates a Delta brainwave which can be indicative of a sleep or rest state. As will be understood by reference to the Figures and their provided descriptions, FIGS. 9(a)-9(e) are presented in a decreasing order with respect to measured frequency.

For purposes of discussion herein, it can be understood that being presented with a given prompt can evoke one or more of the noted brainwaves as the data which can define an authentication pattern for the prompt. This is the case since contemplation for the prompt can cause varying levels of concentration. For instance, an authentication pattern for a target user who views a prompt depicting a summer vacation may include one or more data characteristics of both a Gamma brainwave and an Alpha brainwave since the prompt may evoke a sense of relaxation that the target user experienced during the vacation. Alternatively, the authentication pattern for the target user when viewing a prompt requiring the solution to a mathematical equation may include Alpha and Beta brainwaves reflecting a serious thought process devoted to an accuracy for the solution.

Figure 10:
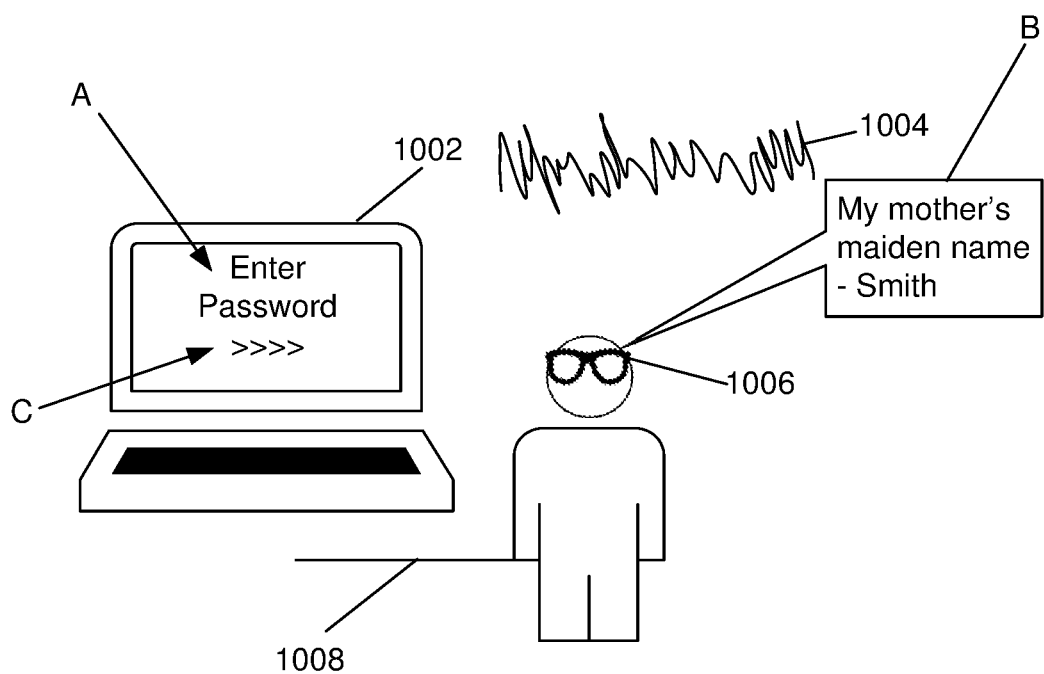
FIG. 10 is a high-level conceptual diagram illustrating aspects of the automated identity authentication according to some implementations of the present technology.

FIG. 10 is a conceptual diagram illustrating aspects of the automated identity authentication system according to some implementations of the present technology. For example, a target user may be presented, via a terminal 1002 (which can be similar to terminal 205D of FIG. 2 for accomplishing same functionality), with a textual prompt of "Enter Password" at "A." In response to the prompt, and knowing that the password is the target user's mother's maiden name, the target user engages in the mental activity of retrieving from memory the corresponding surname of "Smith" at "B." As the retrieval occurs, neural oscillation data 1004 representing the thought processes of formulating the surname responsively to the prompt can be captured by an exemplary data collector in the form of, for example, eyewear device 1006 configured for electroencephalography. The eyewear device 1006 can be configured for wireless communication with the terminal 1002 according to any one or more protocols such as Bluetooth Low Energy (BLE). Accordingly, the terminal 1002 can obtain the neural oscillation data 1004 for processing according to implementations of the present technology as are discussed herein. In a case in which the obtained neural oscillation data matches a reference authentication pattern or is otherwise validated for the prompt, "Enter Password," terminal 1002 can automatically authenticate the target user's identity and/or enter the password of "Smith" at "C." In this way, implementations of the present technology afford a level of secured identity authentication and automated entry for authentication data that, heretofore, have not been provided. Even more, the aforementioned implementations additionally remove opportunity for erroneous data entry (e.g., improper keystroke(s)).

As has also been discussed, implementations of the present technology can invoke a multi-factor approach for authenticating the identity of the target user. An example of such an approach is depicted whereby the target user can be requested to submit for examination one or more biometrics for evaluation by the identity authentication system 164. In the current depiction, such biometrics can include submission of, for example, a fingerprint reading and/or evaluation of one or more ocular characteristics at the time that the neural oscillation data is formulated. In these regards, the fingerprint reading can be obtained by a reader 1008 and eye movement can be captured by, for example, eyewear device 1006 and/or an image recording system of the terminal 1002 for relay to and processing by identity authentication system 164. Information for the target user as to these other biometrics can be stored in one or more of the databases discussed herein. In other words, identity authentication system 164 can require and evaluate, simultaneously, several biometrics in addition to the discussed neural oscillation data for determining whether the target user's identity ought to be authenticated. Alternatively or in addition, identity authentication system 164 can, as another form of the aforementioned multi-factor authentication, present the target user a series of sequenced prompts for which a response is required to access protected data. This way, identity authentication system can formulate the authentication patterns discussed herein as a series of responsive neural oscillation data that may or may not be related such that authentication of the target user's identity can be based on a correlation among separately issued prompts for which a response is required when attempting to access protected data.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method of automatically authenticating an identity of a target user, the method comprising:
providing a user interface, via a first device, that presents a prompt previously registered for the target user, wherein the previous registration was prior to presentation of the prompt by the user interface;
retrieving current neural oscillation data of the target user for the prompt that was previously registered to the target user;
retrieving a prior neural oscillation pattern, previously recorded in relation to the target user, for the prompt that was previously registered to the target user;
converting the retrieved current neural oscillation data and the prior neural oscillation pattern for the prompt that was previously registered to the target user into inputs for a machine learning model, the inputs including A) sets of peak/valley points in the retrieved current neural oscillation data and the prior neural oscillation pattern or B) functions fit to the retrieved current neural oscillation data and the prior neural oscillation pattern;
applying the inputs to the machine learning model, wherein the machine learning model uses the inputs to define a similarity between the retrieved current neural oscillation data and the prior neural oscillation pattern to obtain a match score that reflects the similarity of the retrieved current neural oscillation data and the prior neural oscillation pattern, indicating a probability that the retrieved current neural oscillation data and the prior neural oscillation pattern are from the same user for the prompt that was previously registered to the target user,
wherein the machine learning model is trained, on training data including historical neural oscillation data pairs, by i) generating match score outputs predicting whether the historical neural oscillation data pairs were generated by a same user to a same prompt, ii) comparing the match score outputs to desired outputs, the desired outputs including labels correctly identifying whether the historical neural oscillation data pairs were a match, and iii) modifying the machine learning model based on the comparison;
comparing the match score to a predetermined authentication threshold; and
in response to the match score meeting or exceeding the predetermined authentication threshold, authenticating the target user.

2. The method of claim 1,
wherein the retrieving the current neural oscillation data is performed via a second device at the time the target user perceives the prompt that was previously registered to the target user.

3. The method of claim 1,
wherein the first device obtains the neural oscillation data via electroencephalography components.

4. The method of claim 1,
wherein the prior neural oscillation pattern comprises neural oscillation data of the target user defining an authentication pattern for the prompt that was previously registered to the target user.

5. The method of claim 1,
wherein the converting the retrieved current neural oscillation data and the prior neural oscillation pattern, for the prompt that was previously registered to the target user, into inputs for a machine learning model comprises classifying the retrieved current neural oscillation data and the prior neural oscillation pattern in terms of one or more of (a) wavelength, (b) amplitude, (c) frequency, or any combination thereof.

6. The method of claim 1, further comprising:
verifying that the retrieved current neural oscillation data belongs to the target user at the time of retrieval, based on a determination of one or more biometrics of the target user other than the retrieved current neural oscillation data of the target user.

7. The method of claim 6,
wherein the biometrics comprise at least (a) a fingerprint biometric and/or (b) an ocular biometric.

8. A computing system for automatically authenticating identity of a target user, the computing system comprising:
one or more processors;
one or more memories storing instructions that, when executed by the one or more processors, cause the computing system to perform a process comprising:
causing a user interface, that presents a prompt previously registered for the target user, to be displayed by a first device, wherein the prompt was previously registered for the target user prior to presentation of the prompt by the user interface;
retrieving current neural oscillation data of the target user for the prompt that was previously registered to the target user;
retrieving a prior neural oscillation pattern, previously recorded in relation to the target user, for the prompt that was previously registered to the target user;
converting the retrieved current neural oscillation data and the prior neural oscillation pattern for the prompt that was previously registered to the target user into inputs for a machine learning model, the inputs including A) sets of peak/valley points in the retrieved current neural oscillation data and the prior neural oscillation pattern or B) functions fit to the retrieved current neural oscillation data and the prior neural oscillation pattern;
applying the inputs to the machine learning model, wherein the machine learning model uses the inputs to define a similarity between the retrieved current neural oscillation data and the prior neural oscillation pattern to obtain a match score that reflects the similarity of the retrieved current neural oscillation data and the prior neural oscillation pattern, indicating a probability that the retrieved current neural oscillation pattern and the prior neural oscillation data are from the same user for the prompt that was previously registered to the target user, wherein the machine learning model is trained, on training data including historical neural oscillation data pairs, by i) generating match score outputs predicting whether the historical neural oscillation data pairs were generated by a same user to a same prompt, ii) comparing the match score outputs to desired outputs, the desired outputs including labels correctly identifying whether the historical neural oscillation data pairs were a match, and iii) modifying the machine learning model based on the comparison;

comparing the match score to a predetermined authentication threshold; and in response to the match score meeting or exceeding the predetermined authentication threshold, authenticating the target user.

9. The computing system of claim 8, wherein the retrieving the current neural oscillation data is performed via a second device at the time the target user perceives the prompt that was previously registered to the target user.

10. The computing system of claim 8, wherein the first device is configured to perform electroencephalography.

11. The computing system of claim 8, wherein the prior neural oscillation pattern comprises neural oscillation data of the target user defining an authentication pattern for the prompt that was previously registered to the target user.

12. The computing system of claim 8, wherein the converting the retrieved current neural oscillation data and the prior neural oscillation pattern, for the prompt that was previously registered to the target user, into inputs for a machine learning model comprises classifying the retrieved current neural oscillation data and the prior neural oscillation pattern in terms of one or more of (a) wavelength, (b) amplitude, (c) frequency, or any combination thereof.

13. The computing system of claim 8, wherein the process further comprises:

verifying that the retrieved current neural oscillation data belongs to the target user at the time of retrieval, based on a determination of one or more biometrics of the target user other than the retrieved current neural oscillation data of the target user.

14. A machine-readable storage medium having machine-executable instructions stored thereon that, when executed by one or more processors, cause the one or more processors to perform a method for automatically authenticating identity of a target user, the method comprising:

providing a user interface that presents a prompt previously registered for the target user, wherein the previous registration was prior to presentation of the prompt by the user interface;

retrieving current neural oscillation data of the target user for the prompt that was previously registered to the target user;

retrieving a prior neural oscillation pattern, previously recorded in relation to the target user, for the prompt that was previously registered to the target user;

converting the retrieved current neural oscillation data and the prior neural oscillation pattern for the prompt that was previously registered to the target user into inputs for a machine learning model, the inputs including A) sets of peak/valley points in the retrieved current neural oscillation data and the prior neural oscillation pattern or B) functions fit to the retrieved current neural oscillation data and the prior neural oscillation pattern;

applying the inputs to the machine learning model, wherein the machine learning model uses the inputs to define a similarity between the retrieved current neural oscillation data and the prior neural oscillation pattern to obtain a match score that reflects the similarity of the retrieved current neural oscillation data and the prior neural oscillation pattern, indicating a probability that the retrieved current neural oscillation data and the prior neural oscillation pattern are from the same user for the prompt that was previously registered to the target user, wherein the machine learning model is trained, on training data including historical neural oscillation data pairs, by i) generating match score outputs predicting whether the historical neural oscillation data pairs were generated by a same user to a same prompt, ii) comparing the match score outputs to desired outputs, the desired outputs including labels correctly identifying whether the historical neural oscillation data pairs were a match, and iii) modifying the machine learning model based on the comparison;

comparing the match score to a predetermined authentication threshold; and in response to the match score meeting or exceeding the predetermined authentication threshold, authenticating the target user.

15. The machine-readable storage medium of claim 14, wherein the retrieving the current neural oscillation data is performed via a second device at the time the target user perceives the prompt that was previously registered to the target user and formulates any thought in regard to the prompt that was previously registered to the target user.

16. The machine-readable storage medium of claim 15, wherein the first device and/or the second device are configured to perform electroencephalography.

17. The machine-readable storage medium of claim 14, wherein the prior neural oscillation pattern comprises neural oscillation data of the target user defining an authentication pattern for the prompt that was previously registered to the target user.

18. The machine-readable storage medium of claim 14, wherein the converting the retrieved current neural oscillation data and the prior neural oscillation pattern for the prompt that was previously registered to the target user into inputs for a machine learning model comprises classifying the retrieved current neural oscillation data and the prior neural oscillation pattern in terms of one or more of (a) wavelength, (b) amplitude, (c) frequency, or any combination thereof.

19. The machine-readable storage medium of claim 14, wherein the method further comprises:

verifying that the retrieved current neural oscillation data belongs to the target user the at the time of retrieval, based on a determination of one or more biometrics of the target user other than the retrieved current neural oscillation data of the target user, the biometrics comprising at least (a) a fingerprint biometric and/or (b) an ocular biometric.

20. The method of claim 1, wherein the inputs include B) functions fit to the retrieved current neural oscillation data and the prior neural oscillation pattern.

* * * * *